3,071,584
3,4-DIHYDRO-6-SULFAMYL-3-OXO-2H-1,4-BENZO-
THIAZINE AND PROCESS FOR PREPARATION
Martin Arnold Davis and Stanley O. Winthrop, Montreal, Quebec, Canada, assignors to American Home Products Corporation, New York, N.Y., a corporation of Delaware
No Drawing. Filed June 12, 1959, Ser. No. 819,827
1 Claim. (Cl. 260—243)

This invention relates to a new chemical compound, 3,4-dihydro - 6 - sulfamyl-3-oxo-2H-1,4-benzothiazine, of structural formula:

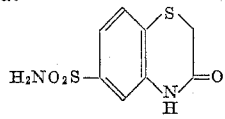

and to the procedure by which this new compound can be prepared from readily available starting materials.

Our new chemical compound, 3,4-dihydro-6-sulfamyl-3-oxo-2H-1,4-benzothiazine, is physiologically active as a diuretic agent.

In preparing our new chemical compound we utilize as starting material the compound 2-nitro-4-sulfamyl-phenylthioglycollic acid of the structural formula:

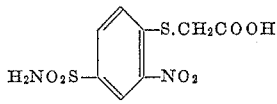

The latter compound may be readily prepared by two methods. In one method 4-chloro-3-nitrobenzenesulfonamide is reacted with thioglycollic acid in the presence of an alkaline material and the desired intermediate product, 2-nitro-4-sulfamylphenylthioglycollic acid, recovered from the reaction mixture.

In a second procedure for preparing our starting material, 2,2' - dinitrodiphenyldisulfide-4,4'-disulfonamide, is converted to 2-nitro-4-sulfamylphenylthioglycollic acid by a method generally similar to that Claasz has described in Ber. 45, page 747 (1912). In this procedure the disulfonamide is reacted with an alkali metal sulfide and an alkali metal salt of monochloroacetic acid.

In preparing our novel chemical compound, 3,4-dihydro-6-sulfamyl-3-oxo-2H-1,4-benzothiazine, possessing physiological activity, from the starting material 2-nitro-4-sulfamylphenylthioglycollic acid, the latter is reduced, as by treatment with metallic tin and hydrochloric acid. Details of this procedure are given below.

EXAMPLE 1

2-Nitro-4-Sulfamylphenylthioglycollic Acid

To a mixture of 37.0 grams (0.4 mole) of thioglycollic acid and 67.0 grams (0.8 mole) of sodium bicarbonate in 500 milliliters of ethanol, there was added 50.0 grams (0.21 mole) of 4-chloro-3-nitrobenzenesulfonamide. The mixture was heated under reflux with active stirring for 10 hours, during which time a yellow-orange precipitate was formed. The mixture was allowed to cool, and it was then filtered and a solid material recovered. This solid material was then dissolved in water and the desired product, 2-nitro-4-sulfamylphenylthioglycollic acid, then recovered from the solution by acidification.

There were thus obtained 44.0 grams of 2-nitro-4-sulfamylphenylthioglycollic acid. Upon recrystallization from mixed ethanol-hexane its melting point, which had previously been 198–200° C. (dec.), was raised to 200–203° C. (dec.). Analysis confirmed the empiric formula $C_8H_8N_2O_6S_2$.

Calculated: N, 9.59; S, 21.94. Found: N, 9.58, 9.39; S, 21.99, 22.24.

EXAMPLE 2

2-Nitro-4-Sulfamylphenylthioglycollic Acid

The compound, 2,2'-dinitrodiphenyldisulfide-4,4'-disulfonamide was prepared by following the procedure described in Example 4 of U.S. Patent 2,733,242. A mixture of 4-chloro-3-nitrobenzenesulfonamide and ethylene-glycol monoethyl ether was heated to 100° C. and a sodium disulfide solution, made from sodium sulfide, sulfur and water, was added at a temperature of 90–100° C. After heating for three hours at 90–95° C., 2,2'-dinitrodiphenyldisulfide-4,4'-disulfonamide was separated as a solid product by hot filtration.

23.3 grams (0.05 mole) of 2,2'-dinitrodiphenyldisulfide-4,4'-disulfonamide was then slurried in 60 milliliters of hot ethanol and treated with an aqueous solution containing 7 grams (0.029 mole) of sodium sulfide nonahydrate and 4 grams (0.1 mole) of sodium hydroxide. This resulted in a dark solution which was rapidly filtered through Celite (diatomaceous earth filter aid).

There was then added to the filtrate an aqueous solution containing 10.0 grams (0.1 mole) of monochloroacetic acid and 6.0 grams (0.05 mole) of sodium carbonate. The reaction mixture was heated on a steam bath for one hour, during which time the color of the solution changed to yellow. Filtration followed by acidification gave a bright yellow product, which was then purified by reprecipitation from sodium bicarbonate solution. There were thus obtained 14.7 grams of 2-nitro-4-sulfamylphenylthioglycollic acid, identical with the same compound as prepared by the procedure described in Example 1.

EXAMPLE 3

3,4-Dihydro-6-Sulfamyl-3-Oxo-2H-1,4-Benzothiazine 15.7 grams of 2-nitro-4-sulfamylphenylthioglycollic acid, 50 grams of granulated tin and 150 milliliters of concentrated hydrochloric acid were heated on a steam bath for 20 minutes. A very bulky precipitate was formed almost at once. The reaction mixture was allowed to cool, and 300 milliliters of water were then added. There were thus obtained 11.3 grams of the new chemical compound, 3,4 - dihydro - 6 - sulfamyl - 3 - oxo - 2H - 1,4-benzothiazine. Upon recrystallization from mixed dioxane-dimethylformamide-hexane, the melting point of the product was raised to 234–5° C. Analysis confirmed the empiric formula $C_8H_8N_2O_3S_2$.

Calculated: N, 11.48; S, 26.25. Found: N, 11.28, 11.36; S, 26.38.

We claim:
3,4-dihydro-6-sulfamyl-3-oxo-2H-1,4-benzothiazine.

References Cited in the file of this patent

UNITED STATES PATENTS 2,886,566    Novello _____ May 12, 1959

OTHER REFERENCES

Mackie et al.: J. Chem. Soc., 1952, pages 787–90.
Mackie et al.: J. Chem. Soc., 1953, pages 3716–17.
Logeman et al.: Nature, vol. 182, pages 1510–11 (1958).